United States Patent [19]

Vernon

[11] 4,028,780
[45] June 14, 1977

[54] LINE RELEASING CLAMP

[76] Inventor: Kenneth O. Vernon, 2001 Stanwood Drive, Santa Barbara, Calif. 93103

[22] Filed: Feb. 10, 1976

[21] Appl. No.: 656,958

[52] U.S. Cl. .............................................. 24/116 R
[51] Int. Cl.² ........................................ F16G 15/00
[58] Field of Search ......... 24/128 K, 115 F, 115 R, 24/270, 116 A, 130, 116 R, 71 T, 71 K, 68 SK, 68 R, 68 CT, 201 TR, 201 A; 114/218

[56] References Cited

UNITED STATES PATENTS

| | | | |
|---|---|---|---|
| 2,873,499 | 2/1959 | Bartholomew | 24/130 |
| 3,574,900 | 4/1971 | Emery | 24/130 |
| 3,715,782 | 2/1973 | Newell | 24/130 R |
| 3,812,811 | 5/1974 | Rodreques | 24/130 |

FOREIGN PATENTS OR APPLICATIONS 8,298  4/1912  United Kingdom ............. 24/128 K

*Primary Examiner*—Paul R. Gilliam
*Assistant Examiner*—Andrew M. Calvert
*Attorney, Agent, or Firm*—James E. Hawes

[57] ABSTRACT

The disclosed line releasing clamp receives a line in a saddle portion of the clamp, the line including a stop lug that is caught against the end of the saddle to resist the tension of the line. The saddle in turn is received in, and pivotally attached to, a clip. Upon the tension in the line exceeding a predetermined amount, the saddle slips free of the clip and pivots sufficiently to permit the stop lug to slip from the saddle, releasing the line.

8 Claims, 3 Drawing Figures

LINE RELEASING CLAMP

BACKGROUND OF THE INVENTION

In many situations, it is necessary to secure a line under tension. Often it is desirable to be able to quickly release the line from its secured position. In a number of applications, it is also important that the line be released automatically upon the tension in the line exceeding a predetermined amount. This tension could be one slightly less than the breaking point of the line, to prevent the line from being ruptured by the tension, or it could be some lesser amount determined by the use to which the line is put. For example, many line clamps or cleats are employed about a sail boat. As the sailing forces increase, the tension in secured lines also increases, it being necessary from time to time to adjust that tension by releasing and resecuring the line. Should such sailing forces increase suddenly, or should the line not be adjusted periodically to optimize sailing conditions, the tension on the line may increase to a point at which either the boat is in danger of capsizing or the line is in danger of breaking. Obviously, in either situation it is quite desirable to employ a clamp for the line that automatically releases it when such a limit condition is approached. This clamp should hold the line securely until the limit condition is reached, then release the line completely.

There are a few cleats or clamps that permit a line to be quickly secured. One typical design wedges the line between two jaws which include teeth forcing the line more deeply into the bite between the jaws. The line may be yanked free by pulling it away from the jaws, this action tending to fray the line. There are a few versions of such clamps or cleats that release the line should its tension exceed a predetermined limit, one design even permitting this release tension to be adjusted by the user. Such designs often challenge the strengths of the material employed in their construction. Often they are bulky and complex as well. In addition, some do not hold the line securely, but permit it to give somewhat with increasing tension, a very undesirable feature for some applications.

BRIEF DESCRIPTION OF THE INVENTION

The line releasing clamp of the present invention provides an elegantly simple mechanism that will receive and securely hold a line, one that will not abrade the line either as it is held against tension or upon its release, and one that will automatically and completely release the line when its tension exceeds a predetermined amount.

In brief, the line releasing clamp includes a saddle portion, or element, that is received in a clip that incorporates protrusions or ridges which mate with the saddle to hold the saddle in the clip. The saddle is pivotally attached to the clip by a pin passing through both elements, the pin being offset from the axis of the line held by the saddle. The saddle is designed to receive a line having one or more enlarged lugs or stop elements located along its length, any selected lug bearing against the end portion of the saddle when the line is seated in the saddle, this bearing relationship resisting tension in the line. Upon the tension in the line exceeding a predetermined amount, the torque exerted by the line upon the saddle and about the pivot pin attaching it to the clip will be sufficient to lift the saddle from the mating, interlocking causing the clip to open. As the saddle pivot about the pivot pin, the lug is released permitting the line to run free.

BRIEF DESCRIPTION OF THE DRAWINGS

The invention will be further described in connection with the accompanying drawings in which.

DETAILED DESCRIPTION OF THE INVENTION

The line releasing clamp is of general application, as has been noted. It may be employed to hold most any type of line, such as a rope or cable, and its dimensions may be adjusted to receive any of a wide range of line diameters. Such a clamp may be used in any numer of different applications, one major application being to secure sailing lines to a sail boat. For example, the clamp may be affixed to the tiller of a catamaran and used to secure the line holding the rudders in the water, the clamp automatically releasing the rudders to rise free should they strike a submerged object, or the sea bottom, such as when breaching the sailboat. As another similar example, the clamp may be used to hold catamaran dagger boards in the water, the boards being released by the clamp should they strike an object.

The clamp assembly consists of only three items, a U-shaped clip 2 that receives and holds a saddle 4, the saddle being attached to the clip by a pivot pin 6 passing through the vertical walls of the clip and through the heel portion of the saddle.

Figure 1:
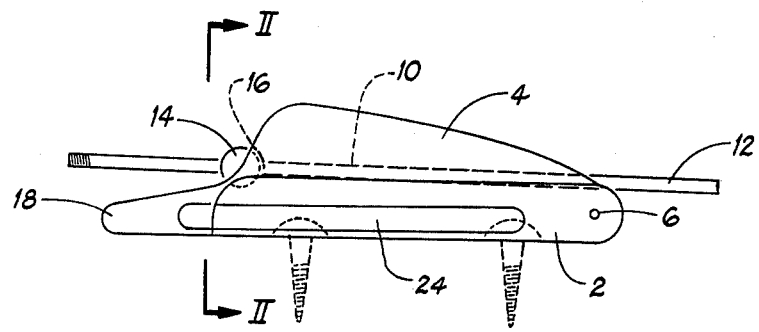
FIG. 1 is a side view showing a preferred embodiment of the clamp with a line in place.

The saddle preferably is molded of rubber or a thermoplastic material. It is shaped generally as shown in the drawing and includes a channel 10 along its upper portion to receive a line 12 under tension. The channel is sized, in proportion to the dimensions of the saddle and clip, to receive a line of appropriate diameter. The line includes one or more enlargements or stop elements 14 along its length, enlargements such as a lug swedged to a cable or a knot in a rope. One such enlargement bears against the concave face, or lug seat, 16 formed in the face of the saddle that is perpendicular to the clip when the saddle is seated in the clip as shown in FIG. 1. The saddle also incorporates a tongue portion 18 that extends beyond the clip. The base of the saddle includes recesses 22 designed to accommodate the heads of such screws or rivets when the saddle is seated as shown in FIG. 1. Preferably the sides defining the channel in the saddle flare outwardly in the area over the pivot pin to permit some lateral freedom of movement in the line secured by the clamp.

Figure 2:
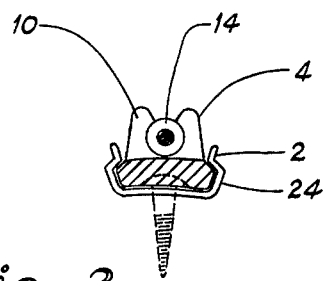
FIG. 2 is an end view of the clamp in partial cross-section taken on lines II — II of FIG. 1.

The clip may be fabricated of a strong, resilient material such as stainless steel with ridges 24 formed in each side along a portion of its length, these ridges engaging matching interlocking ridges molded into each side of the saddle, as shown best in FIG. 2, to hold the saddle seated in the clip. The clip may be attached to most any surface by screws, rivets, or other convenient means (not shown). The base of the clip is concave, as best shown in FIG. 2. Thus, by screwing down the clip to compress this base portion, the ridges of the clip and saddle will interlock more firmly, thereby increasing the force required to cause the saddle to release from the clip.

Figure 3:
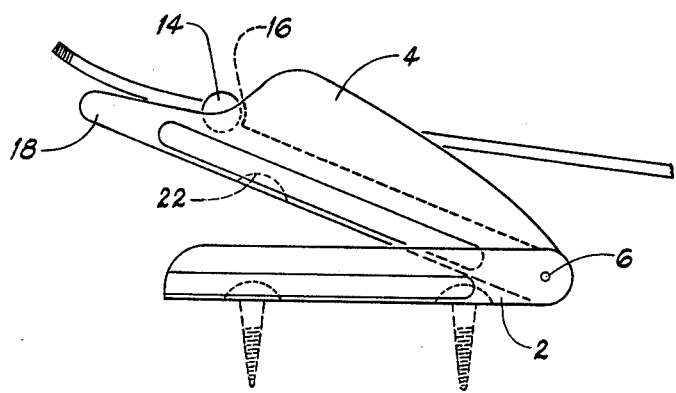
FIG. 3 is a side view similar to FIG. 1 showing the clamp releasing the line.

Latching the clamp, shown open in FIG. 3, to receive a line 12, as shown in FIGS. 1 and 2, is accomplished by pressing down the latching portion 18 of the saddle to force the saddle 4 into clip 2.

As tension in the line 12 increases, the swedged lug 14 bears upon the saddle with increasing force. Since this force is exerted along an axis offset from the pivot pin 6 because of the design of the clamp a torque will result from this tension in the line, the torque tending to left the saddle from the clamp. This is resisted by the interlocked ridge 24 in the clip and saddle until, at some magnitude of tension determined by the resiliency and adjustment of the clip, the depth and length of the ridges, and the offset of the pivot from the axis of the line, the torque becomes great enough to spread the sides of the clip and lift the saddle free, the saddle then rotating to and beyond a position shown in FIG. 3. As this rotation occurs, the torque about the pivot increases and provides a crisp, sudden release. During this rotation, the torque 18 tends to bear on the free end of the line and unseat the lug. When the saddle pivoted enough, the lug slips from its seat in the saddle and the line runs free, thereby automatically releasing the line upon its exceeding a tension determined by the clamp. Of course, this tension can be varied by, for example, varying the depth a length of the ridges of the saddle and clip, or the resiliency or compression of the base of the clip, or offset of the pivot pin from the axis of the line. Modifications to the preferred design also may be made, such as providing an adjustable pivot pin, to vary the release tension of the clamp. Once set through, the tension required to release the clamp should be, and in the preferred design will be, substantially constant from one operation to the next.

To reset the clamp, it is only necessary to push down on the top of the saddle, or upon torque 18, until the saddle snaps into its mating relationship with the clip.

Should debris lodge in the clip and prevent the saddle from fully mating with the clip, the tension required to release the line will be reduced, rather than increased. Thus, seldom if ever will this clamp malfunction and require a tension appreciably greater than the preset tension to release the line. This is a major advantage of the simple yet effective design of the clamp. The line may be manually released simply by tugging on the free end beyond the lug 14.

While a preferred design has been illustrated and described, variations will be apparent to those skilled in this act. For example, teeth or ridges on the opposed faces of channel 10 in the saddle may be employed to hold a rope seated in the saddle, those teeth freeing the rope as the saddle rotates to and beyond the position shown in FIG. 3. Accordingly, the scope of the invention is set forth in the following claims.

I claim:

1. A clamp for holding a line, the clamp including a saddle incorporating a channel shaped to receive a line and means for releasably securing the line to the saddle,
   a clip for holding the saddle, the clip including means for securing it to an element to resist tension on the line received in the saddle,
   means pivotally attaching the saddle to the clip, the pivot being spaced from the axis of the channel in the saddle which receives the line, and
   means releasably attaching the saddle to the clip so that when the saddle is released by the clip, the saddle is free to pivot substantially unrestricted by the clip, the line securing means releasing the line as the saddle pivots about the clip.

2. A clamp as set forth in claim 1 in which the means for releasably securing the line includes a seat at one end of the channel in the saddle, the line bearing an enlargement, the enlargement being received in the seat.

3. A clamp as set forth in claim 1 in which the means releasably attaching the saddle to the clip includes at least one ridge in the saddle which interlocks with a ridge in the clip, these ridges being positioned to, upon the torque exerted by the line upon the saddle and about the pivotal attachment exceeding a predetermined amount, wedge apart and permit the saddle to cam past the clip and be released.

4. A clamp as set forth in claim 3 in which the clip is U-shaped and extends in generally the same direction as the channel in the saddle, the clip and the saddle including two generally coextensive ridges, one in each leg of the U-shaped clip, which interlock with those in the saddle.

5. A clamp as set forth in claim 4, the base of the U-shaped clip being flexible and concave, the means securing the clip to an element varying the concavity of the base whereby the concavity of the base may be varied to vary the interlocking force of the clip and saddle.

6. A clamp as set forth in claim 5 in which the saddle includes a tongue portion extending beyond the clip.

7. A clamp as set forth in claim 5 in which the means for releasably securing the line includes a set at one end of the channel in the saddle, the line bearing an enlargement, the enlargement being received in the seat, the pivotal attachment being adjacent to one end of the U-shaped clip and the seat in the saddle for the lug portion of the line being generally adjacent to the other end of the clip.

8. A clamp as set forth in claim 7 in which the sides defining the channel in the saddle are flared outwardly and enlarged adjacent to the end opposite the end incorporating the seat, the flared portion permitting a line received in the saddle to move laterally.

* * * * *